United States Patent
Hong (10) Patent No.: US 9,582,066 B2
(45) Date of Patent: Feb. 28, 2017

(54) STAND-BY POWER CONTROL DEVICE, LIQUID CRYSTAL DISPLAY DEVICE INCLUDING THE SAME, AND METHOD OF CONTROLLING STAND-BY POWER

(71) Applicant: Samsung Display Co., Ltd., Yongin, Gyeonggi-Do (KR)

(72) Inventor: Sung-Hwan Hong, Suwon-si (KR)

(73) Assignee: Samsung Display Co., Ltd. (KR)

( * ) Notice: Subject to any disclaimer, the term of this patent is extended or adjusted under 35 U.S.C. 154(b) by 64 days.

(21) Appl. No.: 14/522,854

(22) Filed: Oct. 24, 2014

(65) Prior Publication Data
US 2015/0253840 A1    Sep. 10, 2015

(30) Foreign Application Priority Data
Mar. 6, 2014 (KR) .................. 10-2014-0026450

(51) Int. Cl.
*G06F 1/32* (2006.01)
*G09G 3/36* (2006.01)
(Continued)

(52) U.S. Cl.
CPC .......... *G06F 1/3265* (2013.01); *G06F 1/3218* (2013.01); *G06F 1/3234* (2013.01);
(Continued)

(58) Field of Classification Search
CPC .... G06F 1/3265; G06F 1/3218; G06F 1/3296; G06F 1/3234; G09G 3/36; G09G 3/3406; G09G 2330/022; G09G 2330/023; G09G 2330/02; G09G 2330/021; G09G 2330/027; G09G 3/3696; Y10T 307/858; H04N 1/00891; H04N 1/00896; H04N 1/00885; H04N 1/00888; Y02B 60/32;
(Continued)

(56) References Cited

U.S. PATENT DOCUMENTS 6,049,884 A * 4/2000 Tsuji ............... G06F 1/3203
                                                  307/66
7,633,273 B2  12/2009 Lin et al.
(Continued)

FOREIGN PATENT DOCUMENTS

JP      2007-140462        6/2007
KR      1020030088769 A    11/2003
KR      1020100082527 A    7/2010

*Primary Examiner* — Ariel Balaoing
*Assistant Examiner* — Darlene M Ritchie
(74) *Attorney, Agent, or Firm* — Innovation Counsel LLP (57) ABSTRACT

A stand-by power control device includes a power block unit that receives a driving power voltage and a non-driving power voltage from a power supply unit and that selectively provides the driving power voltage or the non-driving power voltage as a supply voltage, a stand-by power generation unit that receives the supply voltage and that outputs a stand-by voltage generated by reducing the supply voltage, a power selection unit that receives the supply voltage and the stand-by voltage and that selectively outputs the supply voltage or the stand-by voltage as an operating voltage, and a state detection unit that receives a state detection voltage from the power supply unit and that controls the power block unit, the stand-by power generation unit, and the power selection unit based on the state detection voltage.

12 Claims, 7 Drawing Sheets

(51) Int. Cl.
   *H04N 1/00* (2006.01)
   *G09G 3/34* (2006.01)
(52) U.S. Cl.
   CPC ............ *G06F 1/3296* (2013.01); *G09G 3/36* (2013.01); *G09G 3/3406* (2013.01); *G09G 2330/022* (2013.01); *H04N 1/00891* (2013.01); *H04N 1/00896* (2013.01); *Y02B 60/1242* (2013.01); *Y02B 60/1285* (2013.01); *Y02B 60/32* (2013.01); *Y10T 307/858* (2015.04)
(58) Field of Classification Search
   CPC ............ Y02B 60/1285; Y02B 60/1242; Y02B 60/1278; Y02B 60/1282
   See application file for complete search history.

(56) References Cited

U.S. PATENT DOCUMENTS

| | | | |
|---|---|---|---|
| 2003/0214825 A1* | 11/2003 | Lee | H02M 7/12 363/84 |
| 2004/0130654 A1* | 7/2004 | Ryu | H04N 1/00899 348/371 |
| 2005/0041352 A1* | 2/2005 | Seo | G06F 1/266 361/92 |
| 2007/0109288 A1* | 5/2007 | Kida | G09G 3/3688 345/211 |
| 2007/0109289 A1 | 5/2007 | Ting | |
| 2008/0024480 A1* | 1/2008 | Jee | G06F 1/3203 345/212 |
| 2008/0036439 A1* | 2/2008 | Kim | B41J 2/04515 323/293 |
| 2010/0091531 A1* | 4/2010 | Lum | H02M 7/04 363/84 |
| 2010/0309802 A1 | 12/2010 | Masuda et al. | |
| 2011/0022867 A1* | 1/2011 | Chang | G06F 1/3218 713/323 |
| 2011/0221483 A1* | 9/2011 | Liu | G06F 1/24 327/142 |
| 2012/0026532 A1* | 2/2012 | Arimoto | H02J 9/005 358/1.14 |
| 2012/0212978 A1 | 8/2012 | Pedersen et al. | |
| 2013/0122973 A1 | 5/2013 | Caskey | |
| 2013/0193940 A1* | 8/2013 | Louvel | H02M 3/156 323/282 |
| 2013/0234606 A1* | 9/2013 | Chen | H05B 37/0218 315/158 |

\* cited by examiner

STAND-BY POWER CONTROL DEVICE, LIQUID CRYSTAL DISPLAY DEVICE INCLUDING THE SAME, AND METHOD OF CONTROLLING STAND-BY POWER

CROSS-REFERENCE TO RELATED APPLICATION(S)

This application claims priority under 35 USC §119 to Korean Patent Applications No. 10-2014-0026450, filed on Mar. 6, 2014 in the Korean Intellectual Property Office (KIPO), the contents of which application are incorporated herein in their entirety by reference.

BACKGROUND

1. Technical Field

The present disclosure of invention relates generally to a display device. More particularly, the present disclosure relates to a stand-by power control device, a liquid crystal display device including the stand-by power control device, and a method of controlling stand-by power for the liquid crystal display device.

2. Description of Related Technology

Recently, according to data processing and mobility convergence trends, demand has soared for a mobile device that includes a plurality of function modules which perform various functions (e.g., communication functions, camera functions, etc) while size, weight of the mobile device become smaller and time between required battery rechargings becomes larger. However, since the mobile device is manufactured to have a small size, and thus its internal battery generally also needs to be of small size, it is difficult to increase the inter-recharge capacity of the battery. This is particularly true in cases where the battery is used for providing a plurality of different internal voltages for application to respective internal components of the mobile device (e.g., volatile memory components, nonvolatile data storage components, user interface components, and/or other such function modules). In other words, since the mobile device is required to perform various functions using limited power (i.e., battery), an optimized battery power management technique is increasingly important for the mobile device in order to increase the inter-recharge capacity of the battery.

It is noted here that power consumption in the typical mobile device mostly includes that of the graphics display functions of the mobile device. More specifically, the graphics display functions are often provided by a liquid crystal display (LCD) device. Generally, the LCD device includes a display panel and a back-light unit for providing light to the display panel. However, a conventional LCD device provides the same voltages to the display panel and to the back-light unit irrespective of whether the user is currently using the mobile device or not. As a result, unnecessary power may be drawn from the battery due to a design that calls for continued generation of same power supply voltages irrespective of whether the user is currently using graphic display features of the mobile device or not.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

A system for controlling a stand-by mode of a power-consuming device is configured to reduce unnecessary power consumption such as that is caused by a liquid crystal display (LCD) portion of the device being in full image producing mode even when a user does not use the power-consuming device. The power-consuming device may be a battery-driven mobile device.

According to an aspect of the disclosed embodiments, a stand-by power control device may include a power block unit configured to receive a driving power voltage and a non-driving power voltage from a power supply unit and to selectively provide the driving power voltage or the non-driving power voltage as a supply voltage, a stand-by power generation unit configured to receive the supply voltage and to output a stand-by voltage generated by reducing the supply voltage, a power selection unit configured to receive the supply voltage and the stand-by voltage and to selectively output the supply voltage or the stand-by voltage as an operating voltage, and a state detection unit configured to receive a state detection voltage from the power supply unit and to control the power block unit, the stand-by power generation unit, and the power selection unit based on the state detection voltage.

In example embodiments, the state detection unit may control a liquid crystal display (LCD) device to operate in an idle mode when the state detection voltage is within a predetermined first voltage range, may control the LCD device to operate in a normal mode when the state detection voltage is within a predetermined different and second voltage range that is higher than the first voltage range, and may control the LCD device to operate in a stand-by mode when the state detection voltage is within a predetermined different and third voltage range that is higher than the second voltage range.

In example embodiments, the state detection unit may receive a first reference voltage for separating the first voltage range from the second voltage range and a second reference voltage for separating the second voltage range from the third voltage range. In addition, the second reference voltage may be greater than the first reference voltage, and the second reference voltage may be smaller than the driving power voltage.

In example embodiments, the state detection unit may output a first selection signal and a second selection signal to the power block unit and the power selection unit, respectively. In addition, the state detection unit may output logical '0' as the first selection signal and logical '1' as the second selection signal in the idle mode, may output logical '1' as the first selection signal and logical '1' as the second selection signal in the normal mode, and may output logical '1' as the first selection signal and logical '0' as the second selection signal in the stand-by mode.

In example embodiments, the power block unit may include a first switch unit configured to supply the driving power voltage as the supply voltage when the first switch unit is turned-on, a second switch unit configured to supply the non-driving power voltage as the supply voltage when the second switch unit is turned-on, and a buffer unit configured to provide the first selection signal and an inverted version of the first selection signal for the first switch unit and the second switch unit to operate contrary to each other.

In example embodiments, the first buffer unit may control the second switch unit to be turned-off when the first switch unit is turned-on, and may control the first switch unit to be turned-off when the second switch unit is turned-on.

In example embodiments, the stand-by power generation unit may include a first load unit configured to receive the supply voltage at a first terminal and to output the stand-by voltage at a second terminal, a second load unit including a variable load, where the second load unit is connected to the second terminal of the first load unit, and a load control unit configured to control the variable load of the second load unit.

In example embodiments, the load control unit may include at least one non-volatile memory device to store a load control signal for controlling a load magnitude of the second load unit.

In example embodiments, the second load unit may include a switch unit configured to operate based on the load control signal, a third load unit connected to the switch unit in series, and a fourth load unit connected to the third load unit and the switch unit in parallel. In addition, the stand-by voltage output to the power selection unit may be reduced when the third load unit and the fourth load unit are connected in parallel as the switch unit is turned-on.

In example embodiments, the power selection unit may include a third switch unit configured to supply the supply voltage as the operating voltage when the third switch unit is turned-on, a fourth switch unit configured to supply the stand-by voltage as the operating voltage when the fourth switch unit is turned-on, and a second buffer unit configured to provide the second selection signal and an inverted version of the second selection signal for the third switch unit and the fourth switch unit to operate contrary to each other.

In example embodiments, the second buffer unit may control the fourth switch unit to be turned-off when the third switch unit is turned-on, and may control the third switch unit to be turned-off when the fourth switch unit is turned-on.

According to another aspect of example embodiments, a liquid crystal display (LCD) device may include a power supply unit configured to output a driving power voltage, a non-driving power voltage, and a state detection voltage based on an external voltage, a power control unit configured to receive the driving power voltage, the non-driving power voltage, and the state detection voltage and to selectively output the driving power voltage, the non-driving power voltage, or a stand-by voltage as an operating voltage based on a voltage level of the state detection voltage, a panel power supply unit configured to receive the operating voltage and to convert the operating voltage into a panel driving voltage, a back-light power supply unit configured to receive the operating voltage and to convert the operating voltage into a back-light driving voltage, a display panel configured to receive the panel driving voltage and to display an image based on the panel driving voltage, and a back-light unit configured to receive the back-light driving voltage and to provide light to the display panel based on the back-light driving voltage.

In example embodiments, the power control unit may include a power block unit configured to receive the driving power voltage and the non-driving power voltage from the power supply unit and to selectively provide the driving power voltage or the non-driving power voltage as a supply voltage, a stand-by power generation unit configured to receive the supply voltage and to output the stand-by voltage generated by reducing the supply voltage, a power selection unit configured to receive the supply voltage and the stand-by voltage and to selectively output the supply voltage or the stand-by voltage as the operating voltage; and a state detection unit configured to receive the state detection voltage from the power supply unit and to control the power block unit, the stand-by power generation unit, and the power selection unit based on the state detection voltage.

According to still another aspect of example embodiments, a method of controlling stand-by power may include an operation of receiving a driving power voltage, a non-driving power voltage, and a state detection voltage, an operation of generating a stand-by voltage by reducing the driving power voltage, an operation of monitoring a voltage level of the state detection voltage, and an operation of selectively providing the driving power voltage, the non-driving power voltage, or the stand-by voltage to a liquid crystal display (LCD) device based on the state detection voltage.

In example embodiments, the LCD device may operate in an idle mode when the state detection voltage is within a first voltage range. In addition, the LCD device may operate in a normal mode when the state detection voltage is within a second voltage range that is higher than the first voltage range. Further, the LCD device may operate in a stand-by mode when the state detection voltage is within a third voltage range that is higher than the second voltage range.

Therefore, a stand-by power control device according to example embodiments may reduce unnecessary power consumption by optimizing power supply based on whether an LCD device that includes a display panel and a back-light unit is being used or not by the user.

A power block unit of the stand-by power control device may control the LCD device to operate in a normal mode by providing a driving power voltage to the LCD device, or may control the LCD device to operate in an idle mode by providing a non-driving power voltage to the LCD device. Here, the LCD device may display an image on the display panel (i.e., may normally drive the back-light) in the normal mode. On the other hand, the LCD device may minimize (or, reduce) power consumption by blocking an external voltage from the LCD device that includes the stand-by power control device in the idle mode.

A stand-by power generation unit of the stand-by power control device may control the LCD device to operate in a stand-by mode for reducing power consumption of the LCD device by providing a stand-by voltage (i.e., reduced voltage) to the LCD device based on load controls. In the stand-by mode, an external voltage may be provided to the stand-by power control device, and the stand-by voltage may be provided to the LCD device except the stand-by power control device. In particular, since a mode-change time from the stand-by mode to the normal mode is shorter than a mode-change time from the idle mode to the normal mode, the LCD device may quickly display an image in response to a user command while performing a power consumption reduction operation in the stand-by mode.

In addition, an LCD device according to example embodiments may perform a power consumption reduction operation by including the stand-by power control device. The stand-by power control device may provide a non-driving power voltage, a driving power voltage, and a stand-by voltage to the LCD device. When the LCD device operates in the idle mode, the stand-by power control device may minimize (or, reduce) power consumption of the LCD device by outputting the non-driving power voltage. That is, when the LCD device operates in the idle mode, the LCD device may not display an image on a display panel. When the LCD device operates in the stand-by mode, the stand-by power control device may reduce the power consumption of the LCD device by outputting the stand-by voltage. Similarly, when the LCD device operates in the stand-by mode, the LCD device may not display an image on the display panel. However, the LCD device may quickly display an image in response to a user command while performing a power consumption reduction operation in the stand-by mode.

Further, a method of controlling stand-by power according to example embodiments may receive a non-driving power voltage and a driving power voltage from an external power source to output a stand-by voltage generated by reducing the driving power voltage, and may provide the driving power voltage, the non-driving power voltage, or the stand-by voltage to an LCD device based on a voltage level of a state detection voltage. Thus, the method of controlling stand-by power may reduce overall power consumption of the LCD device by controlling the LCD device to consume power only in an operating mode (e.g., normal mode).

BRIEF DESCRIPTION OF THE DRAWINGS

Illustrative, non-limiting example embodiments in accordance with the present disclosure of invention will be more clearly understood from the following detailed description taken in conjunction with the accompanying drawings.

DETAILED DESCRIPTION

Hereinafter, embodiments in accordance with the present disclosure of inventive concepts will be explained in detail with reference to the accompanying drawings.

Figure 1:
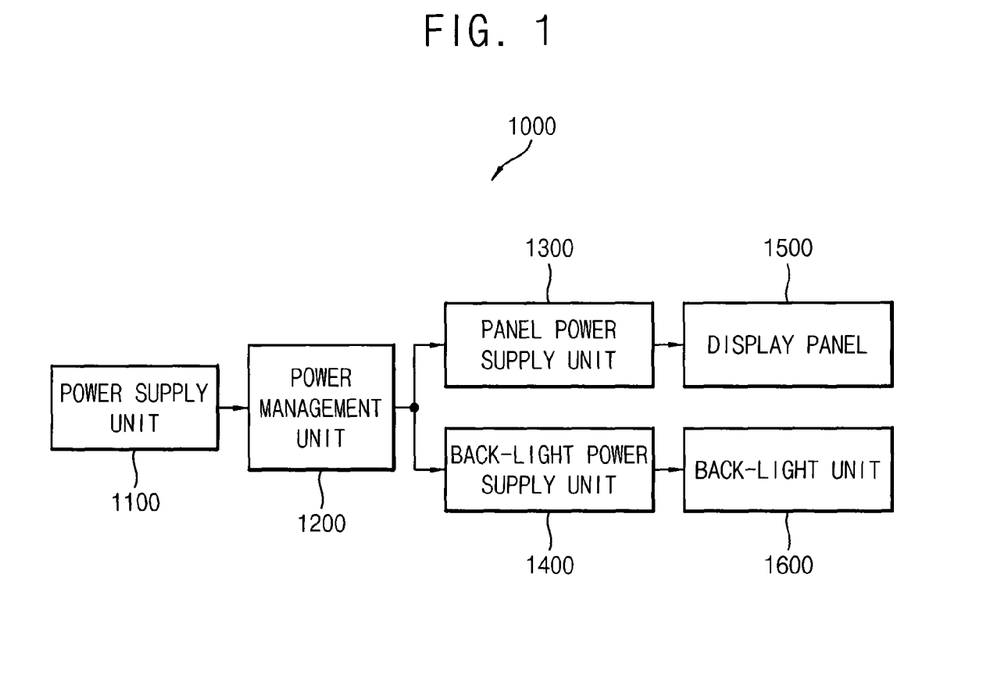
FIG. 1 is a block diagram illustrating relevant parts of a liquid crystal display device that is structured in accordance with the present disclosure.

FIG. 1 is a block diagram illustrating relevant parts of a liquid crystal display (LCD) device structured in accordance with the present disclosure.

Referring to FIG. 1, the liquid crystal display (LCD) device 1000 may include a base source unit (not shown) (e.g., one including a battery as a base power supplying source), a power transforming and supplying unit 1100, a power management unit 1200, a display panel servicing power supply unit 1300, a back-light servicing power supply unit 1400, a serviced display panel 1500, and a serviced back-light providing unit 1600 that can supply backlighting light(s) to the LCD display panel 1500.

More specifically, the base source unit may supply a locally-originated power voltage ($V_o$) and/or current ($I_o$) to the power transforming and supplying unit 1100. In turn, the power transforming and supplying unit 1100 may generate a plurality of transformed voltages (e.g., IV, DV, MDV) that it supplies to the power management unit 1200. The power management unit 1200 may in turn determine which of the transformed voltages (e.g., IV or DV) will be supplied as an operating voltage OPV to the display panel servicing power supply unit 1300 and to the back-light servicing power supply unit 1400.

Thereafter, the panel power supply unit 1300 may change the received operating voltage OPV to have a first voltage level suitable to drive the display panel 1500, and may provide a changed operating voltage having the first voltage level to the display panel 1500. Similarly, the back-light power supply unit 1400 may change the received operating voltage OPV to have a second voltage level suitable to drive the back-light unit 1600, and may provide a changed operating voltage having the second voltage level to the back-light unit 1600. By supplying different operating voltages (e.g., OPV1, OPV2, OPV3), the power management unit 1200 may control the LCD device 1000, causing the latter to operate in a normal mode by providing a normal driving power voltage level DV as the operating voltage (OPV1) to the LCD device 1000, or causing the latter (the LCD device 1000) to operate in an idle mode by providing the non-driving power voltage IV as the operating voltage (OPV2) to the LCD device 1000. In the normal mode, the display panel 1500 may display an image, and the back-light unit 1600 may provide backlighting light to the display panel 1500. That is, the LCD device 1000 may operate normally. In the idle mode, the lower non-driving power voltage level IV may be supplied to the LCD device 1000 (i.e., including to power the power management unit 1200). Thus, power consumption may be minimized (or, reduced) by utilizing the lower level, non-driving power voltage IV. In addition, the power management unit 1200 may control the LCD device 1000 to operate in a stand-by mode for reducing power consumption of the LCD device 1000 by providing a stand-by voltage SBV as the operating voltage (OPV3) to the LCD device 1000 based on load controls, where the stand-by voltage SBV is generated by reducing the normal driving power voltage DV. In one embodiment, a mode-change time from the stand-by mode to the normal mode is shorter than a mode-change time from the idle mode to the normal mode, and as a result, by going into stand-by mode instead of into idle mode, the LCD device 1000 may be more quickly able to go switch into normal mode so as to display an image in response to a user command while achieving some amount of power consumption reduction in the stand-by mode. The power management unit 1200 of FIG. 1 corresponds to a stand-by power control device described below. Hereinafter, the power management unit 1200 of FIG. 1 will also be referred to as the stand-by power control device 1200.

Figure 2:
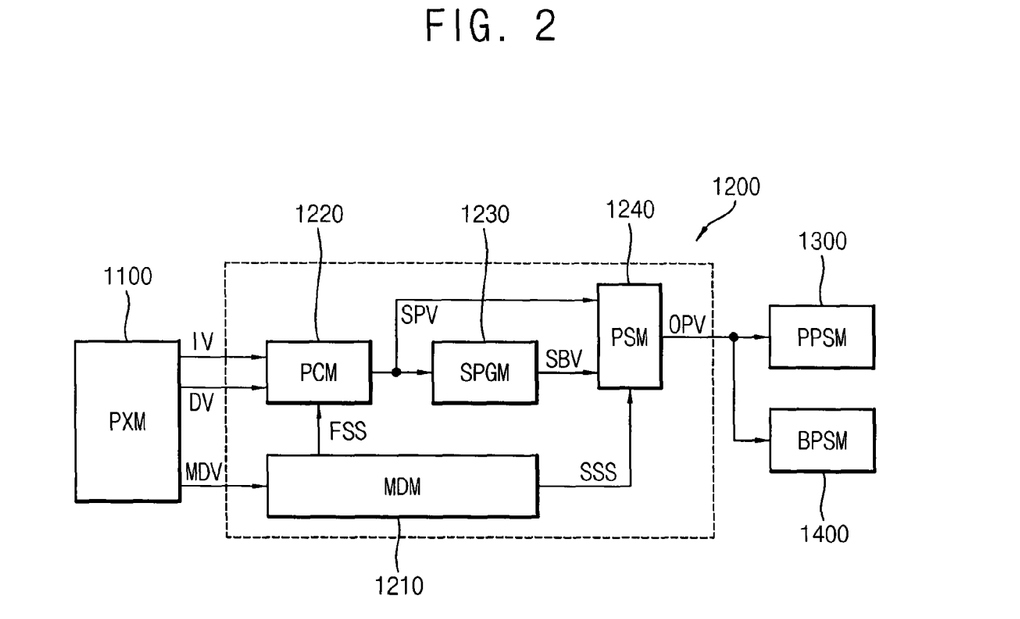
FIG. 2 is a block diagram illustrating a stand-by power control device according to an exemplary embodiment.

FIG. 2 is a block diagram illustrating a stand-by power control device according to example embodiments.

Referring to FIG. 2, the stand-by power control device 1200 may include a state detection unit 1210, a power block unit 1220, a stand-by power generation unit 1230, and a power selection unit 1240. FIG. 2 shows a detailed structure of the stand-by power control device 1200 that supplies the operating voltage OPV to the LCD device 1000 of FIG. 1. The stand-by power control device 1200 may receive the driving power voltage DV, the non-driving power voltage IV, and a state detection voltage MDV from the power supply unit 1100. The received state detection voltage MDV may be an analog voltage signal that is generated by the power transforming and supplying unit 1100 and it (the MDV signal) may represent any of a variety of device state indicating parameters including, but not limited to, an amount of current now and/or recently drawn from the base source unit, an amount of electrical power now and/or recently drawn from the base source unit, a rolling average taken over a predetermined time window of an amount of electrical power now and/or recently drawn from the base source unit, a rolling average taken over a predetermined time window of an amount of usage now and/or recently for a user interface means such as a touch sensitive screen and/or a user keyboard or user actuated button, and so on.

The state detection unit 1210 may output control signals that are used to control the power block unit 1220, the stand-by power generation unit 1230, and the power selection unit 1240 based on the state detection voltage MDV output from the power supply unit 1100. Specifically, when the state detection voltage MDV is within a predetermined first voltage range FR, the state detection unit 1210 may supply respective first and second selection signals FSS and SSS to control the LCD device 1000 to operate in the idle mode. In addition, when the state detection voltage MDV is within a predetermined and non-overlapping second voltage range SR, the state detection unit 1210 may supply respective first and second selection signals FSS and SSS to control the LCD device 1000 to operate in the normal mode. Further, when the state detection voltage MDV is within a predetermined and non-overlapping third voltage range TR, the state detection unit 1210 may supply respective first and second selection signals FSS and SSS to control the LCD device 1000 to operate in the stand-by mode. Here, the first selection signal FSS may be supplied to the power block unit 1220, and the second selection signal SSS may be supplied to the power selection unit 1240.

As described above, the power block unit 1220 (a.k.a. Power Control Module or PCM 1220) may receive the first selection signal FSS, and the power selection unit 1240 (a.k.a. Power Selection Module or PSM 1240) may receive the second selection signal SSS. In an example embodiment, the state detection unit 1210 may output logical '0' as the first selection signal FSS, and may output logical '1' as the second selection signal SSS when the state detection voltage MDV is within the first voltage range FR. As a result, the LCD device 1000 may operate in the idle mode. In addition, the state detection unit 1210 may output logical '1' as the first selection signal FSS, and may output logical '1' as the second selection signal SSS when the state detection voltage MDV is within the second voltage range SR. As a result, the LCD device 1000 may operate in the normal mode. Further, the state detection unit 1210 may output logical '1' as the first selection signal FSS, and may output logical '0' as the second selection signal SSS when the state detection voltage MDV is within the third voltage range TR. As a result, the LCD device 1000 may operate in the stand-by mode.

Figure 3:
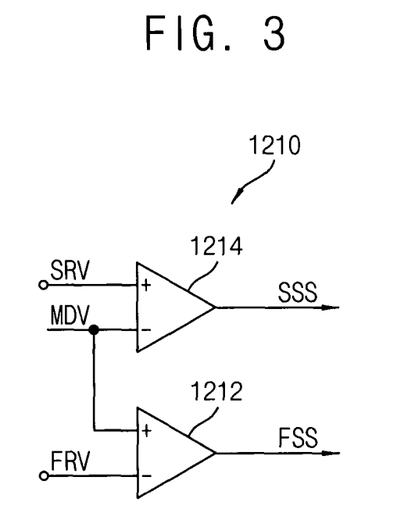
FIG. 3 is a diagram illustrating an example of a state detection unit included in the stand-by power control device of FIG. 2.

Referring to FIG. 3, the state detection unit 1210 may receive, in addition to the state detection voltage MDV, a predetermined first reference voltage FRV and a predetermined and different second reference voltage SRV where the latter are used to determine which of plural predetermined ranges the state detection voltage MDV is in (i.e., among the first voltage range FR, the second voltage range SR, and the third voltage range TR). In an example embodiment, the first reference voltage FRV may separate the first voltage range FR from the second voltage range SR, and similarly the second reference voltage SRV may separate the second voltage range SR from the third voltage range TR. Here, the second reference voltage SRV may be greater than the first reference voltage FRV, and the second reference voltage SRV may be smaller than the driving power voltage DV. That is, the second voltage range SR may be higher than the first voltage range FR, and the third voltage range TR may be higher than the second voltage range SR as is indicated for example in the FSS and SSS logic level diagrams of FIGS. 4A and 4B respectively.

Figure 5:
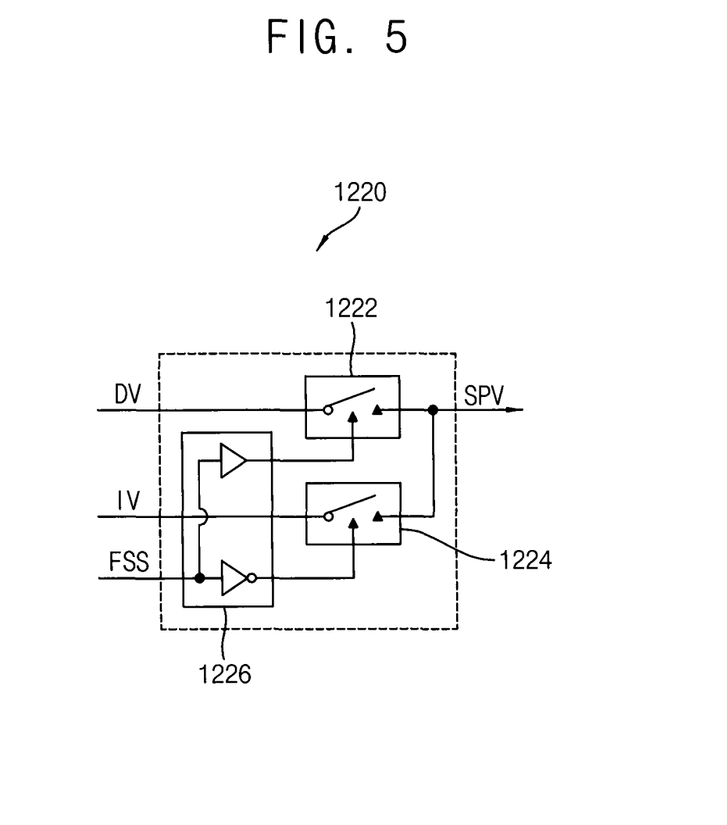
FIG. 5 is a diagram illustrating an example of a power block unit included in the stand-by power control device of FIG. 2.

Referring to FIG. 5, the power block unit 1220 may receive the driving power voltage DV or the non-driving power voltage IV from the power supply unit 1100 based on the logic state of the first selection signal FSS, and the power block unit 1220 may responsively output either the driving power voltage DV or the non-driving power voltage IV as a supply voltage SPV. The supply voltage SPV output from the power block unit 1220 may be supplied to the stand-by power generation unit 1230 and the power selection unit 1240. In the idle mode, the non-driving power voltage IV may be supplied to the stand-by power generation unit 1230 and the power selection unit 1240 as the supply voltage SPV. In the normal mode, the driving power voltage DV may be supplied to the stand-by power generation unit 1230 and the power selection unit 1240 as the supply voltage SPV. In the stand-by mode, a stand-by voltage SBV may be supplied to the panel power supply unit 1300 and the back-light power supply unit 1400 as the operating voltage OPV, where the stand-by voltage SBV is generated by reducing the driving power voltage DV.

More specifically, the power block unit 1220 may include a first switch unit 1222 and a second switch unit 1224 (e.g., pass transistors). When the first switch unit 1222 is turned-on, the driving power voltage DV may be supplied as the supply voltage SPV. When the second switch unit 1224 is turned-on, the non-driving power voltage IV may be supplied as the supply voltage SPV. In addition, the power block unit 1220 may control the first switch unit 1222 and the second switch unit 1224 based on the first selection signal FSS. Here, the first switch unit 1222 and the second switch unit 1224 may operate contrary (as logical inverses) to each other because the first selection signal FSS is transferred to the first switch unit 1222 and the second switch unit 1224 via a first buffer unit 1226. That is, the first buffer unit 1226 may provide the first selection signal FSS to the first switch unit 1222, and may invert the first selection signal FSS to provide inverted first selection signal to the second switch unit 1224. For example, the first switch unit 1222 may be turned-on when the second switch unit 1224 is turned-off, and the second switch unit 1224 may be turned-on when the first switch unit 1222 is turned-off.

As described above, the state detection unit 1210 may control the first selection signal FSS to have logical '0' in the idle mode, and may control the first selection signal FSS to have logical '1' in the normal mode and the stand-by mode. Therefore, when the first selection signal FSS has logical '0', the power block unit 1220 may output the non-driving power voltage IV as the supply voltage SPV output to the stand-by power generation unit 1230 and the power selection unit 1240. On the other hand, when the first selection signal FSS has logical '1', the power block unit 1220 may output the driving power voltage DV as the supply voltage SPV output to the stand-by power generation unit 1230 and the power selection unit 1240.

Figure 6:
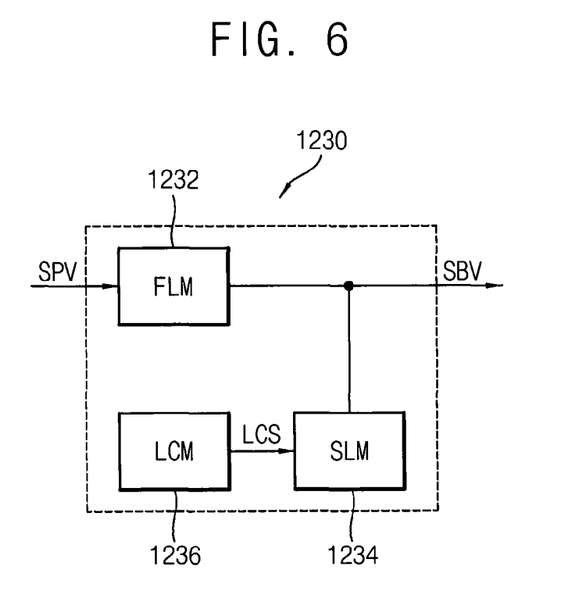
FIG. 6 is a diagram illustrating an example of a stand-by power generation unit included in the stand-by power control device of FIG. 2.

Referring to FIG. 6, the stand-by power generation unit 1230 may receive the supply voltage SPV from the power block unit 1220, and may generate therefrom the stand-by voltage SBV which is supplied to the power selection unit 1240, where the stand-by voltage SBV is generated by to be less than (a reduction of) the supply voltage SPV. If the stand-by power generation unit 1230 receives the non-driving power voltage IV as the supply voltage SPV from the power block unit 1220, a situation in which a voltage generated by reducing the non-driving power voltage IV is output to the power selection unit 1240 as the stand-by voltage SBV may occur. However, as described below, the voltage generated by reducing the non-driving power voltage IV is not supplied to the LCD device 1000 as the operating voltage OPV by operations of the power selection unit 1240. Thus, the stand-by power generation unit 1230 may receive the driving power voltage DV as the supply voltage SPV, and may supply a voltage generated by reducing the driving power voltage DV to the power selection unit 1240 as the stand-by voltage SBV. Meanwhile, the stand-by voltage SBV may be supplied to the LCD device 1000 as the operating voltage OPV in the stand-by mode.

More specifically, the stand-by power generation unit 1230 may include a first load unit 1232 (FLM) and a second load unit 1234 (SLM) connected in a voltage divider configuration. The first load unit 1232 may receive the supply voltage SPV at a first terminal, and may output the stand-by voltage SBV as a second terminal. The second load unit 1234 may be connected to the second terminal of the first load unit 1232. Here, the second load unit 1234 may be a variable load capable of controlling a load magnitude. The stand-by voltage SBV may be determined by a ratio between a load magnitude of the first load unit 1232 and a load magnitude of the second load unit 1234. According to a voltage divider rule, the stand-by voltage SBV may be proportional to the load magnitude of the second load unit 1234. The first and second load units, 1232 and 1234, need not be mere resistive loads that convert a drive current passed through them merely into waste heat. Instead, one or both of the first and second load units, 1232 and 1234, may perform a respective form of useful work within the mobile device 1000. Such useful work may include digital and/or analog signal processing functions carried out within the mobile device 1000.

Figure 7:
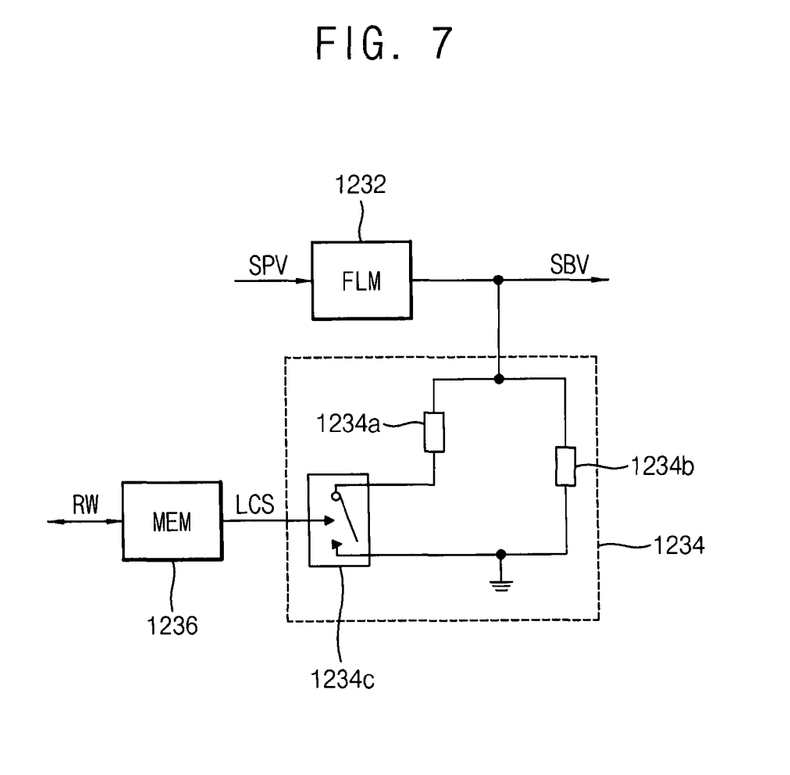
FIG. 7 is a diagram illustrating an example in which a stand-by power is generated based on load controls by the stand-by power generation unit of FIG. 6.

Further, and referring here also to FIG. 7, the stand-by power generation unit 1230 may include a load control unit 1236 (LCM) that controls the load magnitude of the second load unit 1234. The load control unit 1236 may determine a voltage level of the stand-by voltage SBV by controlling the load magnitude of the second load unit 1234. In an example embodiment, the load control unit 1236 may include at least one non-volatile memory device 1236 that provides a load control signal LCS to the second load unit 1234. In this case, a user may determine a voltage level of the stand-by voltage SBV by storing the load control signal LCS in the non-volatile memory device.

The second load unit 1234 may control the load magnitude based on the load control signal LCS received from the load control unit 1236. In an example embodiment, the second load unit 1234 may include a switch unit 1234c that is controlled based on the load control signal LCS, a third load unit 1234a that is connected to the switch unit 1234c in series, and a fourth load unit 1234b that is connected to the third load unit 1234a and the switch unit 1234c in parallel. The switch unit 1234c may be turned-on based on the load control signal LCS received from the load control unit 1236. When the switch unit 1234c is turned-on, the third load unit 1234a and the fourth load unit 1234b may be connected in parallel. Thus, the stand-by voltage SBV output to the power selection unit 1240 may be reduced by selectively adding on additional loads as appropriate for extant conditions.

Specifically, when the switch unit 1234c is fully turned-off by the load control signal LCS, a parallel circuit including the third load unit 1234a and the fourth load unit 1234b may be changed to a series circuit including the fourth load unit 1234b. Here, a load magnitude formed by only the fourth load unit 1234b may be greater than a load magnitude formed by the third load unit 1234a and the fourth load unit 1234b (i.e., the parallel circuit). Thus, when the switch unit 1234c is fully turned-off, the load magnitude of the second load unit 1234 may be maximized. As a result, the stand-by voltage SBV may have the highest voltage level. On the other hand, when the switch unit 1234c is fully turned-on by the load control signal LCS, the parallel circuit including the third load unit 1234a and the fourth load unit 1234b may be formed. Thus, when the switch unit 1234c is fully turned-on, the load magnitude of the second load unit 1234 may be minimized. As a result, the stand-by voltage SBV may have the lowest voltage level.

Figure 8:
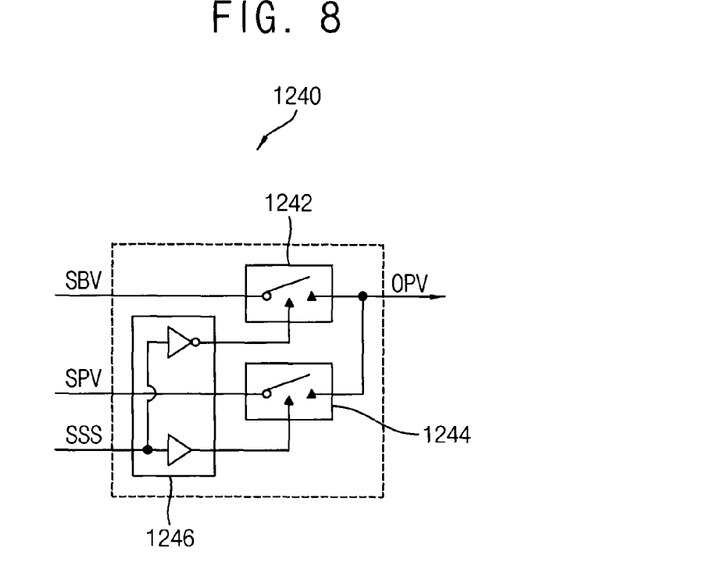
FIG. 8 is a diagram illustrating an example of a power selection unit included in the stand-by power control device of FIG. 2.

Referring to FIG. 8, it may be seen that, based on the second selection signal SSS, the power selection unit 1240 may selectively output as the operating voltage OPV, either the full supply voltage SPV received from the power block unit 1220 or the smaller stand-by voltage SPV generated by and received from the stand-by power generation unit 1230. The supply voltage SPV output from the power selection unit 1240 may be supplied to the panel power supply unit 1300 and the back-light power supply unit 1400. For example, the stand-by voltage SBV may be supplied as the operating voltage OPV in the stand-by mode, and the supply voltage SPV may be supplied as the operating voltage OPV in the idle mode and the normal mode.

More specifically, the power selection unit 1240 may include a third switch unit 1242 and a fourth switch unit 1244. When the third switch unit 1242 is turned-on, the supply voltage SPV may be supplied as the operating voltage OPV. When the fourth switch unit 1244 is turned-on, the stand-by voltage SBV may be supplied as the operating voltage OPV. In addition, the power selection unit 1240 may control the third switch unit 1242 and the fourth switch unit 1244 based on the second selection signal SSS. Here, the third switch unit 1242 and the fourth switch unit 1244 may operate contrary (as inverses) to each other because the second selection signal SSS is transferred to the third switch unit 1242 and the fourth switch unit 1244 via a second buffer unit 1246. That is, the second buffer unit 1246 may provide the second selection signal SSS to the fourth switch unit 1244, and may invert the second selection signal SSS to provide inverted second selection signal to the third switch unit 1242. For example, the third switch unit 1242 may be turned-on when the fourth switch unit 1244 is turned-off, and the fourth switch unit 1244 may be turned-on when the third switch unit 1242 is turned-off.

As described above, the state detection unit 1210 may control the second selection signal SSS to have logical '0' in the stand-by mode, and may control the second selection signal SSS to have logical '1' in the idle mode and the normal mode. Therefore, when the second selection signal SSS has logical '1', the power selection unit 1240 may output the supply voltage SPV as the operating voltage OPV output to the panel power supply unit 1300 and the back-light power supply unit 1400. On the other hand, when the second selection signal SSS has logical '0', the power selection unit 1240 may output the stand-by voltage SBV as the operating voltage OPV output to the panel power supply unit 1300 and the back-light power supply unit 1400.

The stand-by power control device 1200 may reduce power consumption by controlling a voltage level of the operating voltage OPV based on an operating state of the LCD device 1000. When the driving power voltage DV is supplied to the panel power supply unit 1300 and the back-light power supply unit 1400 as the operating voltage OPV, the LCD device 1000 may operate in the normal mode. In the normal mode, the display panel 1500 and the back-light unit 1600 may normally operate without performing a power consumption reduction operation. When the non-driving power voltage IV is supplied to the panel power supply unit 1300 and the back-light power supply unit 1400 as the operating voltage OPV, the LCD device 1000 may operate in the idle mode. In the idle mode, the display panel 1500 and the back-light unit 1600 may not implement an image. Here, since the LCD device 1000 operates based on minimum power, the LCD device 100 may minimize power consumption in the idle mode. When the stand-by voltage SBV is supplied to the panel power supply unit 1300 and the back-light power supply unit 1400 as the operating voltage OPV, the LCD device 1000 may operate in the stand-by mode. In the stand-by mode, the display panel 1500 and the back-light unit 1600 may not implement an image. Here, since the LCD device 1000 operates based on reduced power (i.e., higher than the minimum power), a mode of the LCD device 100 may be quickly changed from the stand-by mode to the normal mode.

Figure 4A:
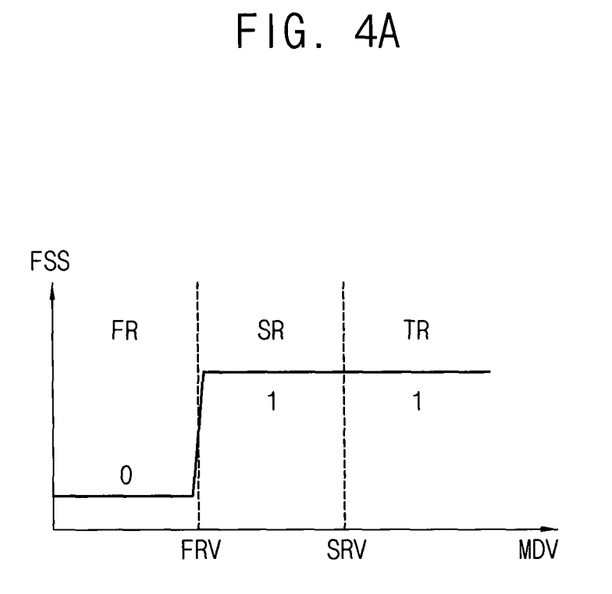
FIG. 4A is a timing diagram illustrating an example in which a first selection signal is generated by the state detection unit of FIG. 3.
Figure 4B:
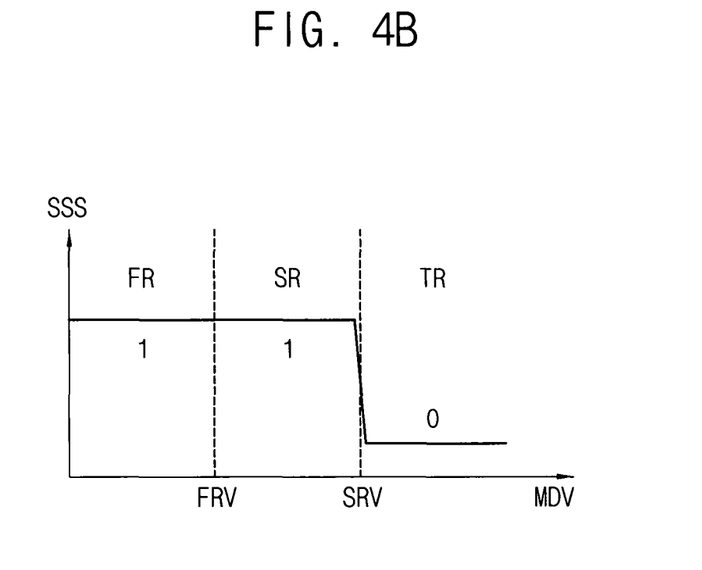
FIG. 4B is a timing diagram illustrating an example in which a second selection signal is generated by the state detection unit of FIG. 3.

As mentioned above, FIG. 3 is a diagram illustrating an example of a state detection unit included in the stand-by power control device of FIG. 2. FIG. 4A is a timing diagram illustrating an example in which a first selection signal is generated by the state detection unit of FIG. 3. FIG. 4B is a timing diagram illustrating an example in which a second selection signal is generated by the state detection unit of FIG. 3.

Referring to FIGS. 3 through 4B, the state detection unit 1210 may include a first comparison unit 1212 and a second comparison unit 1214. Here, as illustrated in FIGS. 4A and 4B, the first selection signal FSS and the second selection signal SSS may have logical '0' or logical '1', respectively according to where the state detection voltage MDV is (i.e., among the first voltage range FR, the second voltage range SR, and the third voltage range TR).

The first comparison unit 1212 may receive the state detection voltage MDV at a first input, may receive the first reference voltage FRV at a second input, and may output the first selection signal FSS. The first comparison unit 1212 may output logical '0' as the first selection signal FSS when the state detection voltage MDV is greater than the first reference voltage FRV, and may output logical '0' as the first selection signal FSS when the state detection voltage MDV is smaller than the first reference voltage FRV. As described above, when the state detection voltage MDV is smaller than the first reference voltage FRV, the LCD device 1000 may operate in the idle mode. Thus, when the LCD device 1000 operates in the idle mode, the first selection signal FSS may have logical '0'. On the other hand, when the LCD device 1000 operates in the normal mode and the stand-by mode, the first selection signal FSS may have logical '1'. The second comparison unit 1214 may receive the second reference voltage SRV at a first input, may receive the state detection voltage MDV at a second input, and may output the second selection signal SSS. The second comparison unit 1214 may output logical '0' as the second selection signal SSS when the state detection voltage MDV is greater than the second reference voltage SRV, and may output logical '1' as the second selection signal SSS when the state detection voltage MDV is smaller than the second reference voltage SRV. As described above, when the state detection voltage MDV is greater than the second reference voltage SRV, the LCD device 1000 may operate in the stand-by mode. Thus, when the LCD device 1000 operates in the stand-by mode, the second selection signal SSS may have logical '0'. On the other hand, when the LCD device 1000 operates in the normal mode and the idle mode, the second selection signal SSS may have logical '1'.

As mentioned above, FIG. 5 is a diagram illustrating an example of a power block unit included in the stand-by power control device of FIG. 2.

Referring to FIG. 5, the power block unit 1220 may include the first switch unit 1222, the second switch unit 1224, and the first buffer unit 1226. Since the first switch unit 1222 and the second switch unit 1224 of the power block unit 1220 are described with reference to FIG. 2, duplicated description will not be repeated. Thus, the power block unit 1220 will be described below by focusing on the first buffer unit 1226.

The first buffer unit 1226 may receive the first selection signal FSS from the state detection unit 1210, and may control the first switch unit 1222 and the second switch unit 1224 to operate contrary to each other. For example, the first switch unit 1222 may be turned-on when the second switch unit 1224 is turned-off, and the second switch unit 1224 may be turned-on when the first switch unit 1222 is turned-off. In an example embodiment, the first buffer unit 1226 may provide the first selection signal FSS as a control signal to the first switch unit 1222, and may invert the first selection signal FSS to provide inverted first selection signal as a control signal to the second switch unit 1224. The first switch unit 1222 may be turned-on when a control signal having logical '1' is applied to the first switch unit 1222. The second switch unit 1224 may be turned-on when a control signal having logical '1' is applied to the second switch unit 1224. Since the first selection signal FSS has logical '0' in the idle mode, the first switch unit 1222 may be turned-off, and the second switch unit 1224 may be turned-on. Thus, the non-driving power voltage IV received from the second switch unit 1224 may be output as the supply voltage SPV. Since the first selection signal FSS has logical '1' in the normal mode and the stand-by mode, the first switch unit 1222 may be turned-on, and the second switch unit 1224 may be turned-off. Thus, the driving power voltage DV received from the first switch unit 1222 may be output as the supply voltage SPV.

When the non-driving power voltage IV is supplied, the LCD device 1000 may stop operating. In an example embodiment, the non-driving power voltage IV may be 0 volt (V). That is, in the idle mode, input voltages of driving elements that drive the LCD device 1000 may be 0V. In this case, output voltages of the driving elements may be maintained to be respective voltage levels that can secure at least secure electrical stability of the LCD device 1000. In another example embodiment, the non-driving power voltage IV may correspond to an open-circuit state. That is, in the idle mode, voltage-input terminals of driving elements that drive the LCD device 1000 may be disconnected to voltage sources. In this case, each of the driving elements may include means for securing the electrical stability of the LCD device 1000. In addition, power consumption of the LCD device 1000 may be minimized in the idle mode. However, a voltage level of the non-driving power voltage IV is not limited to the above embodiments. For example, a voltage level of the non-driving power voltage IV may be any voltage level that can stop operations of a system to minimize (or, reduce) power consumption of the system.

As mentioned above, FIG. 6 is a diagram illustrating an example of a stand-by power generation unit included in the stand-by power control device of FIG. 2. FIG. 7 is a diagram illustrating an example in which a stand-by power is generated based on load controls by the stand-by power generation unit of FIG. 6.

Referring to FIGS. 6 and 7, the stand-by power generation unit 1230 may receive the supply power SPV, and may output the stand-by voltage SBV to the power selection unit 1240, where the stand-by voltage SBV is generated by reducing the supply voltage SPV based on a voltage division between the first load unit 1232 and the second load unit 1234. The second load unit 1234 may include a variable load capable of controlling a load magnitude. The load control unit 1236 may provide the second load unit 1234 with the load control signal LCS to control the load magnitude of the second load unit 1234.

In an example embodiment, as illustrated in FIG. 7, the load control unit 1236 may include at least one non-volatile memory device for storing the load control signal LCS. In addition, the second load unit 1234 may include the third load unit 1234a, the fourth load unit 1234b that is connected to the third load unit 1234a in parallel, and the switch unit 1234c that is connected to the third load unit 1234a in series. The load control unit 1236 may provide the load control signal LCS stored in the non-volatile memory device by a user to the switch unit 1234c. The switch unit 1234c may be turned-on by the load control signal LCS. As a result, the load control unit 1236 may change the load magnitude of a parallel circuit including the third load unit 1234a and the fourth load unit 1234b by controlling a turn-on operation of the switch unit 1234c. In another example embodiment, the second load unit 1234 may include a variable resistance element. In this case, a resistance of the variable resistance element may be controlled by the load control signal LCS received from the load control unit 1236. Although the load control unit 1236 (i.e., structure and operation) is described above, the load control unit 1236 is not limited to the above embodiments.

FIG. 8 is a diagram illustrating an example of a power selection unit included in the stand-by power control device of FIG. 2.

Referring to FIG. 8, the power selection unit 1240 may include the third switch unit 1242, the fourth switch unit 1244, and the second buffer unit 1246. Since the third switch unit 1242 and the fourth switch unit 1244 of the power selection unit 1240 are described with reference to FIG. 2, duplicated description will not be repeated. Thus, the power selection unit 1240 will be described below by focusing on the second buffer unit 1246.

The second buffer unit 1246 may receive the second selection signal SSS from the state detection unit 1210, and may control the third switch unit 1242 and the fourth switch unit 1244 to operate contrary to each other. For example, the third switch unit 1242 may be turned-on when the fourth switch unit 1244 is turned-off, and the fourth switch unit 1244 may be turned-on when the third switch unit 1242 is turned-off. In an example embodiment, the second buffer unit 1246 may provide the second selection signal SSS as a control signal to the fourth switch unit 1244, and may invert the second selection signal SSS to provide inverted second selection signal as a control signal to the third switch unit 1242. The third switch unit 1242 may be turned-on when a control signal having logical '1' is applied to the third switch unit 1242. The fourth switch unit 1244 may be turned-on when a control signal having logical '1' is applied to the fourth switch unit 1244. Since the second selection signal SSS has logical '0' in the stand-by mode, the third switch unit 1242 may be turned-on, and the fourth switch unit 1244 may be turned-off. Thus, the stand-by voltage SBV received from the third switch unit 1242 may be output as the operating voltage OPV. Since the second selection signal SSS has logical '1' in the normal mode and the idle mode, the third switch unit 1242 may be turned-off, and the fourth switch unit 1244 may be turned-on. Thus, the supply voltage SPV received from the fourth switch unit 1244 may be output as the operating voltage OPV.

Figure 9:
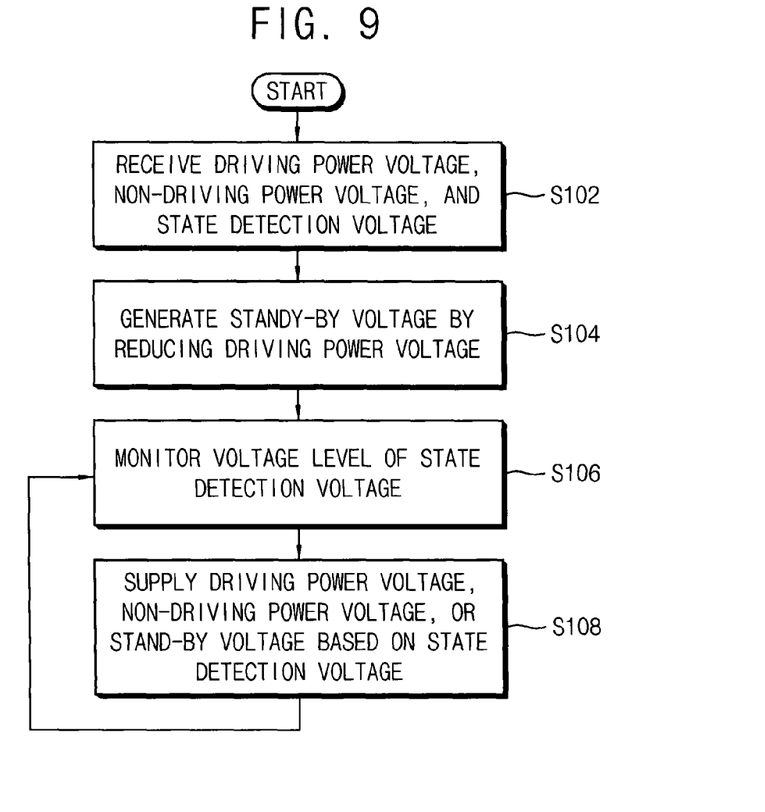
FIG. 9 is a flow chart illustrating a method of controlling stand-by power according to example embodiments.
Figure 10:
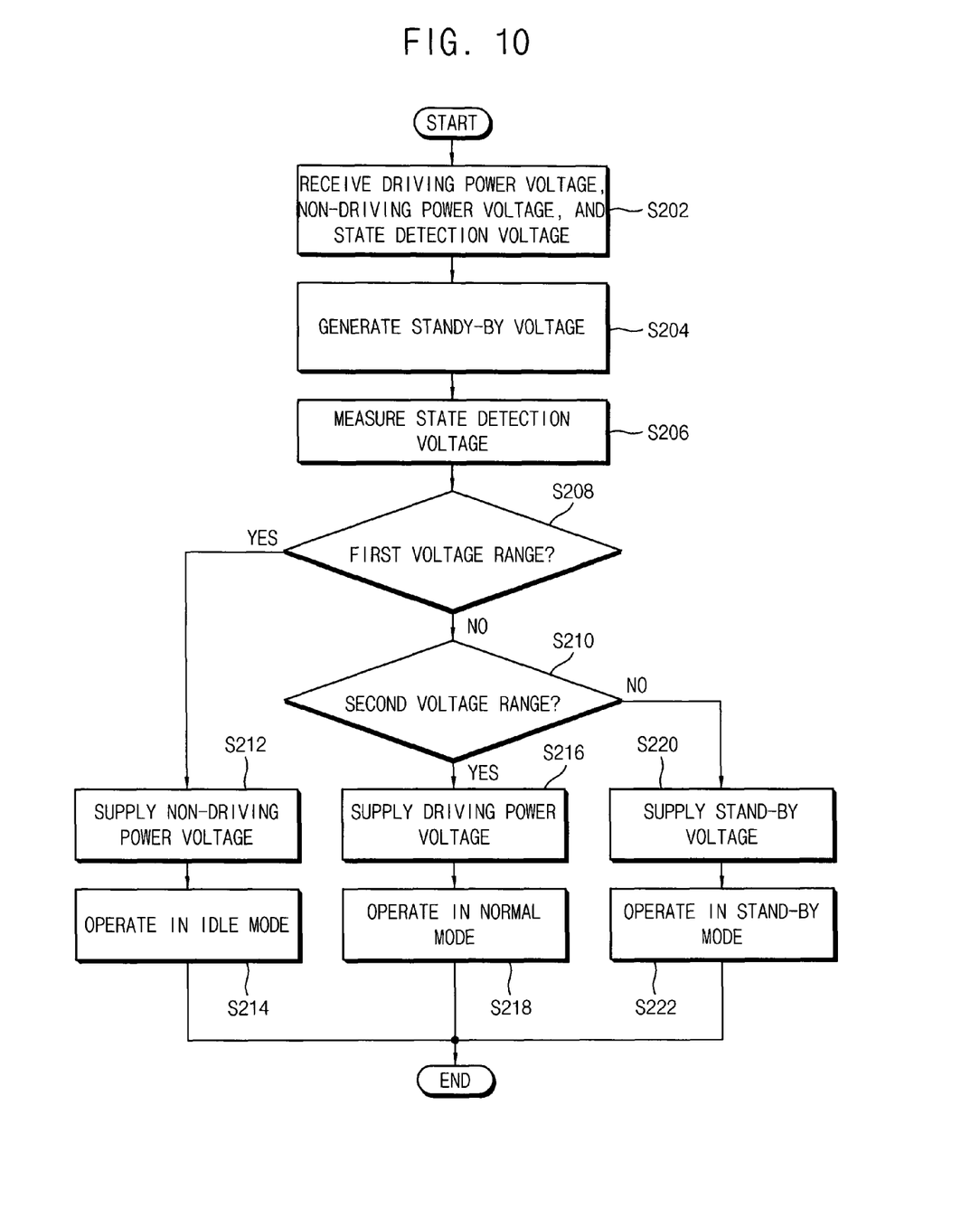
FIG. 10 is a flow chart diagram illustrating an example in which an operating mode is determined by the method of FIG. 9.
Figure 11:
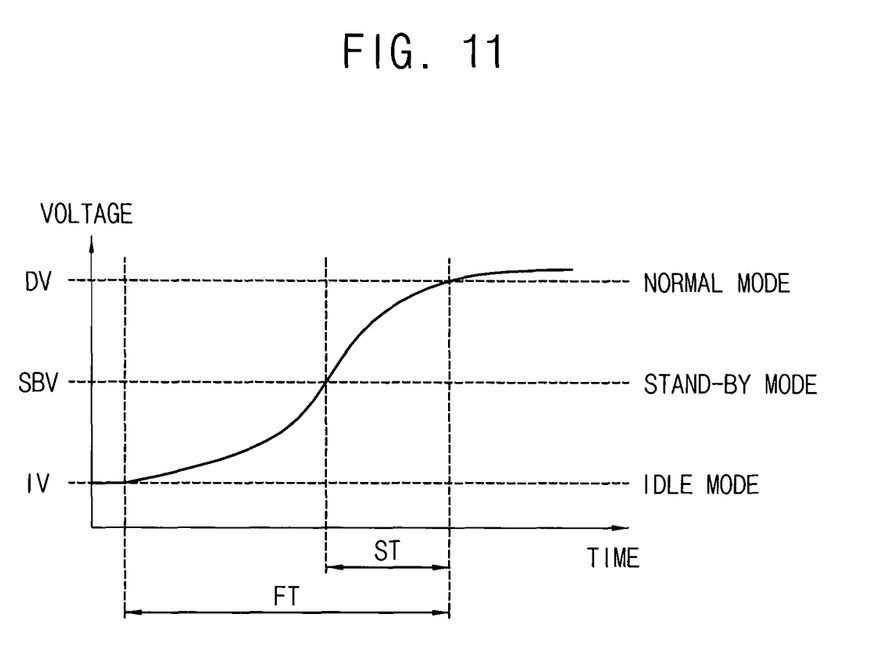
FIG. 11 is a timing diagram illustrating an example in which an operating mode is changed by the method of FIG. 9.

FIG. 9 is a flow chart illustrating a method of controlling stand-by power according to example embodiments. FIG. 10 is a diagram illustrating an example in which an operating mode is determined by the method of FIG. 9. FIG. 11 is a timing diagram illustrating an example in which an operating mode is changed by the method of FIG. 9.

Referring to FIGS. 9 through 11, a mobile device operating in accordance with the method of FIG. 9 may receive, at a power management portion thereof, a driving power voltage DV, a non-driving power voltage IV, and a state detection voltage MDV (S102), and may generate a stand-by voltage SBV by reducing the driving power voltage DV (S104). In addition, a mobile device operating in accordance with the method of FIG. 9 may monitor the state detection voltage MDV (S104), and may selectively provide the driving power voltage DV, the non-driving power voltage IV, or the stand-by voltage SBV based on a voltage level of the state detection voltage MDV (S108). Here, the method of FIG. 9 may automatically repetitively perform the above operations S106 and S108 while a liquid crystal display (LCD) device operates. In a normal mode (S218), the method of FIG. 9 may supply the driving power voltage DV to the LCD portion of the device. In an idle mode (S214), the method of FIG. 9 may supply the non-driving power voltage IV to the LCD portion of the device. Here, it takes a first time FT for a mode of the LCD device to be changed from the idle mode to the normal mode. In a stand-by mode (S222), the method of FIG. 9 may supply the stand-by voltage SBV to the LCD device. Here, it takes a second time ST for a mode of the LCD device to be changed from the stand-by mode to the normal mode.

When the LCD device operates in the normal mode (S218), the LCD device may display an image because the LCD device receives the driving power voltage DV. In addition, when the LCD device operates in the idle mode (S214), the LCD device may perform a power consumption reduction operation (i.e., may minimize power consumption) because the LCD device receives the non-driving power voltage IV. Further, when the LCD device operates in the stand-by mode (S222), the LCD device may perform a power consumption reduction operation (i.e., may reduce power consumption) because the LCD device receives the stand-by voltage SBV generated by reducing the driving power voltage DV. As described above, since a mode-change time (i.e., the second time ST) from the stand-by mode (S222) to the normal mode (S218) is shorter than a mode-change time (i.e., the first time FT) from the idle mode (S214) to the normal mode (S218), the LCD device may quickly display an image in response to a user command while performing a power consumption reduction operation in the stand-by mode (S222).

As illustrated in FIG. 10, the LCD device may receive the driving power voltage DV, the non-driving power voltage IV, and the state detection voltage MDV (S202). When the non-driving power voltage IV is supplied as an operating voltage OPV, the LCD device may stop operating. In an example embodiment, the non-driving power voltage IV may be 0V. That is, in the idle mode (S214), input voltages of driving elements that drive the LCD device may be 0V. In this case, output voltages of the driving elements may be maintained to be respective voltage levels that can secure at least secure electrical stability of the LCD device. In another example embodiment, the non-driving power voltage IV may correspond to an open-circuit state. That is, in the idle mode (S214), voltage-input terminals of driving elements that drive the LCD device may be disconnected to voltage sources. In this case, each of the driving elements may include means for securing the electrical stability of the LCD device. In addition, power consumption of the LCD device may be minimized in the idle mode (S214). However, a voltage level of the non-driving power voltage IV is not limited to the above embodiments. For example, a voltage level of the non-driving power voltage IV may be any voltage level that can stop operations of a system to minimize (or, reduce) power consumption of the system. The driving power voltage DV may be a voltage for normally driving a display panel and a back-light unit of the LCD device to display an image. Next, the method of FIG. 9 may generate the stand-by voltage SBV by reducing the driving power voltage DV (S204). The stand-by voltage SBV may be greater than the non-driving power voltage IV, and may be smaller than the driving power voltage DV. Subsequently, the method of FIG. 9 may measure and monitor the state detection voltage MDV to determine an operating mode of the LCD device (S206). To this end, the method of FIG. 9 may divide a voltage range to which the state detection voltage MDV belongs into a plurality of voltage ranges, and may allocate the operating mode (i.e., the normal mode, the idle mode, and the stand-by mode) of the LCD device to respective voltage ranges. Thus, when the state detection voltage MDV is within a specific voltage range, the LCD device may operate in the operating mode (i.e., the normal mode, the idle mode, or the stand-by mode) corresponding to the specific voltage range.

In an example embodiment, a voltage range to which the state detection voltage MDV belongs may be divided into a first voltage range FR, a second voltage range SR, and a third voltage range TR. Here, the first voltage range FR, the second voltage range SR, and the third voltage range TR may not overlap each other. For example, after the state detection voltage MDV is measured (S206), the method of FIG. 9 may check whether the state detection voltage MDV is within (i.e., belongs to) the first voltage range FR (S208). Here, when the state detection voltage MDV is within the first voltage range FR, the method of FIG. 9 may provide the non-driving power voltage IV to the LCD device (S212). Thus, the LCD device may operate in the idle mode (S214). In addition, the method of FIG. 9 may check whether the state detection voltage MDV is within the second voltage range SR (S210). Here, when the state detection voltage MDV is within the second voltage range SR, the method of FIG. 9 may provide the driving power voltage DV to the LCD device (S216). Thus, the LCD device may operate in the normal mode (S218). Further, when the state detection voltage MDV is not within the first voltage range FR and the second voltage range SR, the method of FIG. 9 may provide the stand-by voltage SBV to the LCD device (S220). Thus, the LCD device may operate in the stand-by mode (S222). That is, when the state detection voltage MDV is not within the first voltage range FR and the second voltage range SR, the state detection voltage MDV may be determined to be within the third voltage range TR. Meanwhile, the method of FIG. 9 may continuously measure and monitor the state detection voltage MDV while the LCD device operates in the idle mode (S214), in the normal mode (S218), or in the stand-by mode (S222). Hence, an operating mode of the LCD device may be changed in real-time based on a change (i.e., fluctuation) of the state detection voltage MDV.

FIG. 11 shows mode-change times according to respective operating voltages of the normal mode (S218), the idle mode (S214), and the stand-by mode (S222). When the LCD device operates in the normal mode (S218), the driving power voltage DV may be used without any voltage reduction in order to normally drive the display panel and the back-light unit of the LCD device. That is, when the LCD device operates in the normal mode (S218), the LCD device may normally display an image (i.e., the LCD device may not perform the power consumption reduction operation). When the LCD device operates in the idle mode (S214), the non-driving power voltage IV may be used (i.e., the driving power voltage DV may not be supplied). That is, when the LCD device operates in the idle mode (S214), the LCD device may minimize the power consumption. In an example embodiment, the non-driving power voltage IV may be 0V. That is, in the idle mode (S214), input voltages of driving elements that drive the LCD device may be 0V. In this case, output voltages of the driving elements may be maintained to be respective voltage levels that can secure at least secure electrical stability of the LCD device. In another example embodiment, the non-driving power voltage IV may correspond to an open-circuit state. That is, in the idle mode (S214), voltage-input terminals of driving elements that drive the LCD device may be disconnected to voltage sources. In this case, each of the driving elements may include means for securing the electrical stability of the LCD device. As a result, the power consumption of the LCD device may be reduced (i.e., minimized). However, a voltage level of the non-driving power voltage IV is not limited to the above embodiments. For example, a voltage level of the non-driving power voltage IV may be any voltage level that can stop operations of a system to minimize (or, reduce) power consumption of the system. When the LCD device operates in the stand-by mode (S222), the stand-by voltage SBV generated by reducing the driving power voltage DV may be used. As a result, the power consumption of the LCD device may be reduced. In this case, since the stand-by voltage SBV is greater than the non-driving power voltage IV, a mode-change time (i.e., the second time ST) from the stand-by mode to the normal mode may be shorter than a mode-change time (i.e., the first time FT) from the idle mode to the normal mode.

The present disclosure of inventive concepts may be applied to a battery powered device, for example a mobile device, including a liquid crystal display device as a portion thereof. For example, the present inventive concept may be applied to a computer, a laptop, a television, a cellular phone, a smart phone, a smart pad, a personal digital assistant (PDA), a portable multimedia player (PMP), an MP3 player, a tablet PC, a digital camera, a camcorder, a portable game console, a navigation system, etc.

The foregoing is illustrative of example embodiments and is not to be construed as limiting thereof. Although a few example embodiments have been described, those skilled in the art will readily appreciate in view of the foregoing that many modifications are possible in the example embodiments without materially departing from the novel teachings and advantages of the here disclosed inventive concepts. Accordingly, all such modifications are intended to be included within the scope of the present inventive concept as provided by the present teachings.

What is claimed is:

1. A power control subsystem for use in a power consuming device, the subsystem comprising:
    a liquid crystal display (LCD) device;
    a power block unit configured to receive a driving power voltage and a non-driving power voltage from a power supply unit, and to selectively provide the driving power voltage or the non-driving power voltage as a supply voltage;
    a stand-by power generation unit configured to receive the supply voltage, and to output a stand-by voltage that is generated by reducing the supply voltage;
    a power selection unit configured to receive the supply voltage and the stand-by voltage, and to selectively output the supply voltage or the stand-by voltage as an operating voltage; and
    a state detection unit configured to receive a state detection voltage from the power supply unit, and to control the power block unit, the stand-by power generation unit, and the power selection unit based on the state detection voltage, wherein
    the state detection unit is configured to control the liquid crystal display (LCD) device so as to operate in an idle mode when the state detection voltage is within a predetermined first voltage range,
    the state detection unit is configured to control the LCD device so as to operate in a normal mode when the state detection voltage is within a non-overlapping and predetermined second voltage range that is higher than the first voltage range, and
    the state detection unit is configured to control the LCD device so as to operate in a stand-by mode when the state detection voltage is within a non-overlapping and predetermined third voltage range that is higher than the second voltage range.

2. The device of claim 1, wherein
    the state detection unit receives a first reference voltage that demarks a separation of the first voltage range from the second voltage range and a second reference voltage that demarks a separation of the second voltage range from the third voltage range, and
    wherein the second reference voltage is greater than the first reference voltage, and the second reference voltage is smaller than the driving power voltage.

3. The device of claim 2, wherein
    the state detection unit outputs a first selection signal and a second selection signal to the power block unit and the power selection unit, respectively, and
    wherein the state detection unit outputs logical '0' as the first selection signal and logical '1' as the second selection signal in the idle mode, outputs logical '1' as the first selection signal and logical '1' as the second selection signal in the normal mode, and outputs logical '1' as the first selection signal and logical '0' as the second selection signal in the stand-by mode.

4. The device of claim 1, wherein the power block unit includes:
    a first switch unit configured to supply the driving power voltage as the supply voltage when the first switch unit is turned-on;
    a second switch unit configured to supply the non-driving power voltage as the supply voltage when the second switch unit is turned-on; and
    a buffer unit configured to provide the first selection signal and an inverted version of the first selection signal for the first switch unit and the second switch unit to operate contrary to each other.

5. The device of claim 4, wherein the first buffer unit controls the second switch unit to be turned-off when the first switch unit is turned-on, and controls the first switch unit to be turned-off when the second switch unit is turned-on.

6. The device of claim 1, wherein the stand-by power generation unit includes:
    a first load unit configured to receive the supply voltage at a first terminal, and to output the stand-by voltage at a second terminal;
    a second load unit including a variable load, the second load unit being connected to the second terminal of the first load unit; and
    a load control unit configured to control the variable load of the second load unit.

7. The device of claim 6, wherein the load control unit includes at least one non-volatile memory device to store a load control signal for controlling a load magnitude of the second load unit.

8. The device of claim 7, wherein the second load unit includes:
    a switch unit configured to operate based on the load control signal;
    a third load unit connected to the switch unit in series; and
    a fourth load unit connected to the third load unit and the switch unit in parallel, and wherein the stand-by voltage output to the power selection unit is reduced when the third load unit and the fourth load unit are connected in parallel as the switch unit is turned-on.

9. The device of claim 1, wherein the power selection unit includes:
    a third switch unit configured to supply the supply voltage as the operating voltage when the third switch unit is turned-on;
    a fourth switch unit configured to supply the stand-by voltage as the operating voltage when the fourth switch unit is turned-on; and
    a second buffer unit configured to provide the second selection signal and an inverted version of the second selection signal for the third switch unit and the fourth switch unit to operate contrary to each other.

10. The device of claim 9, wherein the second buffer unit controls the fourth switch unit to be turned-off when the third switch unit is turned-on, and controls the third switch unit to be turned-off when the fourth switch unit is turned-on.

11. A power consuming device having an image displaying capability and comprising:
    a power supply unit configured to output a driving power voltage, a non-driving power voltage, and a state detection voltage based on an external voltage;
    a power control unit configured to receive the driving power voltage, the non-driving power voltage, and the state detection voltage, and to selectively output the driving power voltage, the non-driving power voltage, or a stand-by voltage as an operating voltage based on a voltage level of the state detection voltage;

a panel power supply unit configured to receive the operating voltage, and to convert the operating voltage into a panel driving voltage;

a back-light power supply unit configured to receive the operating voltage, and to convert the operating voltage into a back-light driving voltage;

a display panel configured to receive the panel driving voltage, and to display an image based on the panel driving voltage; and a back-light unit configured to receive the back-light driving voltage, and to provide light to the display panel based on the back-light driving voltage, wherein the power control unit includes:

a power block unit configured to receive the driving power voltage and the non-driving power voltage from the power supply unit, and to selectively provide the driving power voltage or the non-driving power voltage as a supply voltage;

a stand-by power generation unit configured to receive the supply voltage, and to output the stand-by voltage generated by reducing the supply voltage;

a power selection unit configured to receive the supply voltage and the stand-by voltage, and to selectively output the supply voltage or the stand-by voltage as the operating voltage; and a state detection unit configured to receive the state detection voltage from the power supply unit, and to control the power block unit, the stand-by power generation unit, and the power selection unit based on the state detection voltage, and wherein the state detection unit is configured to control the display panel so as to operate in an idle mode when the state detection voltage is within a predetermined first voltage range, the state detection unit is configured to control the display panel so as to operate in a normal mode when the state detection voltage is within a non-overlapping and predetermined second voltage range that is higher than the first voltage range, and the state detection unit is configured to control the display panel so as to operate in a stand-by mode when the state detection voltage is within a non-overlapping and predetermined third voltage range that is higher than the second voltage range.

12. A method of controlling a stand-by state of a power-consuming device, the method comprising:

receiving a driving power voltage, a non-driving power voltage, and a state detection voltage;

generating a stand-by voltage by reducing the driving power voltage;

monitoring a voltage level of the state detection voltage; and selectively providing the driving power voltage, the non-driving power voltage, or the stand-by voltage to a liquid crystal display (LCD) device based on the state detection voltage, wherein the power-consuming device operates in an idle mode when the state detection voltage is within a first voltage range, the power-consuming device operates in a normal mode when the state detection voltage is within a second voltage range that is higher than the first voltage range, and the power-consuming device operates in a stand-by mode when the state detection voltage is within a third voltage range that is higher than the second voltage range.

* * * * *